Nov. 25, 1958  C. V. COLLINS  2,862,077
AUTOMATIC SWITCH CONTROLLING MECHANISM
Filed Sept. 8, 1955  2 Sheets-Sheet 1
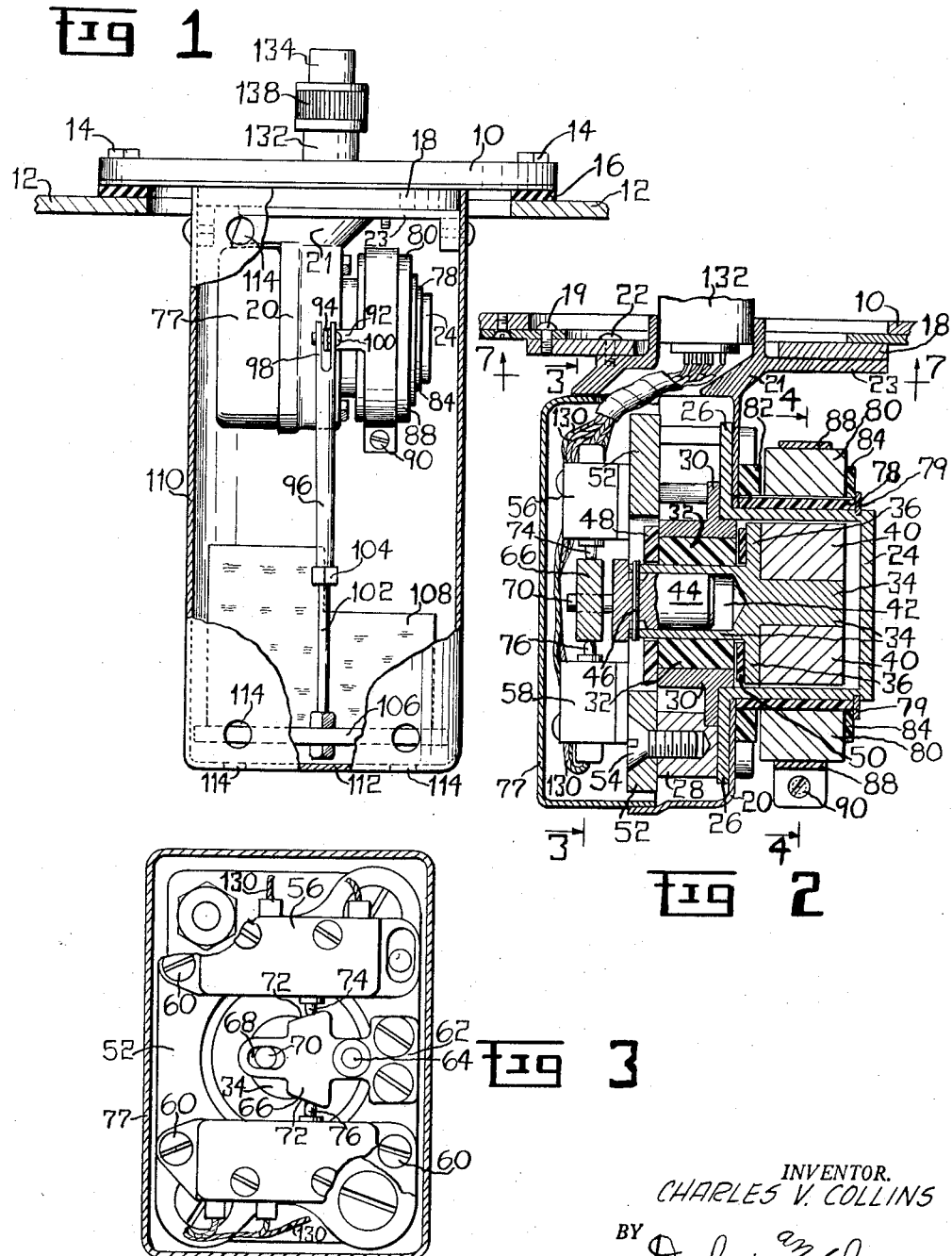
INVENTOR.
CHARLES V. COLLINS
BY Dybvig and Jacox
HIS ATTORNEYS Nov. 25, 1958   C. V. COLLINS   2,862,077
AUTOMATIC SWITCH CONTROLLING MECHANISM
Filed Sept. 8, 1955   2 Sheets-Sheet 2
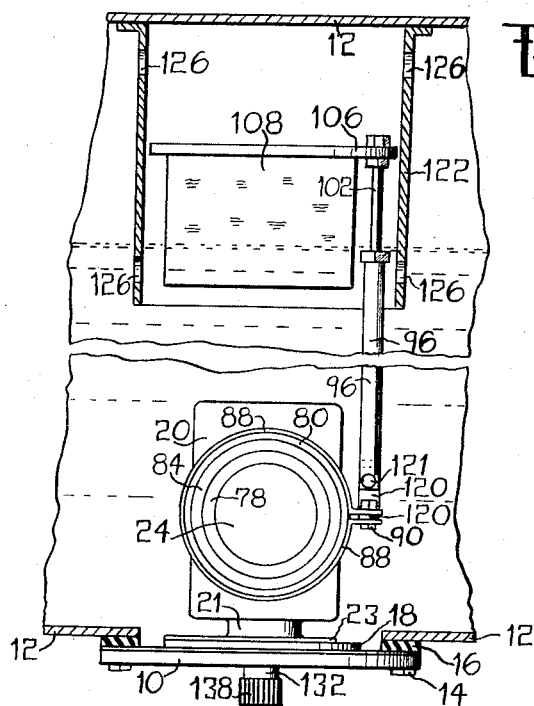
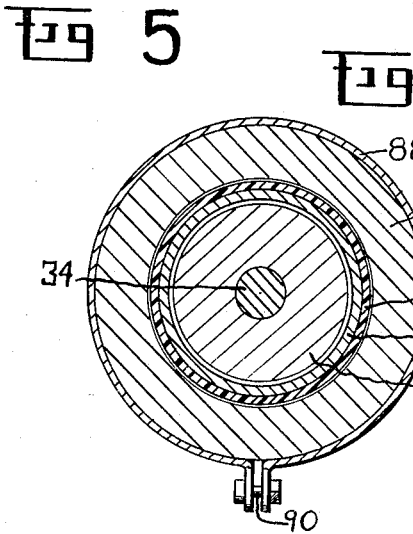
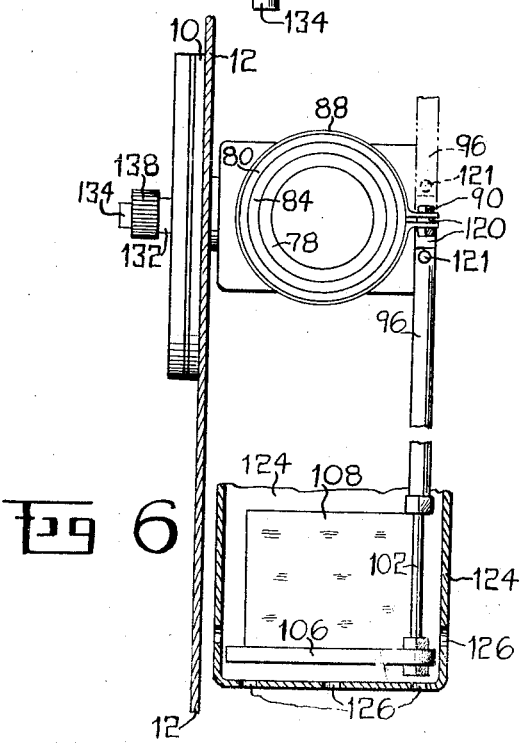
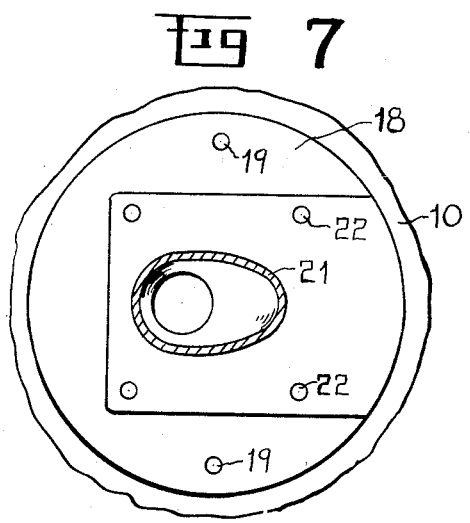
INVENTOR.
CHARLES V. COLLINS
BY Dybvig and Jacox
HIS ATTORNEYS

UNITED STATES PATENT OFFICE

United States Patent Office 2,862,077
Patented Nov. 25, 1958

2,862,077

AUTOMATIC SWITCH CONTROLLING MECHANISM

Charles V. Collins, Dayton, Ohio

Application September 8, 1955, Serial No. 533,149

9 Claims. (Cl. 200—84)

This invention relates to an automatic switch controlling mechanism. The invention relates more particularly to a liquid level indicating device.

This invention is a continuation-in-part of my copending application Serial No. 229,198, filed on or about May 31, 1951, now Patent No. 2,717,934.

In connection with fuel tanks carried by air craft, it is highly desirable that means be provided to indicate accurately and rapidly the liquid level within the fuel tank. It is also highly desirable to have such a liquid level indicating device which is compact and light in weight.

Hence it is an object of this invention to provide a liquid level indicating device which may be built of small physical size and which is sturdy in weight, and long lived.

A further object of the invention is to provide a liquid level indicating device which operates properly when disposed in any position within a liquid tank.

A further object of this invention is to provide a liquid level indicating device, the moving parts of which may be enclosed in a sealed chamber.

Another object of this invention is to provide a liquid level indicating device for fuel tanks, which device may be quickly and easily mounted or detached from the fuel tank.

Another object of this invention is to provide such a liquid level indicating device which can be easily and readily assembled and disassembled.

Other objects and advantages reside in the construction of parts, the combination thereof and the mode of operation as will become more apparent from the following description.

In the drawings,

Figure 1 is a side elevational view, with parts broken away, showing an automatic switch controlling mechanism of this invention.

Figure 2 is an enlarged section view showing the rotating members and switch members of the automatic switch controlling mechanism of this invention.

Figure 3 is a section view taken substantially on line 3—3 of Figure 2.

Figure 4 is a section view taken substantially on line 4—4 of Figure 2.

Figure 5 shows an automatic switch controlling mechanism of this invention attached to the bottom enclosing wall of a liquid tank.

Figure 6 shows an automatic switch controlling mechanism of this invention attached to a side enclosing wall of a liquid tank.

Figure 7 is a section view taken substantially on line 7—7 of Figure 2.

Referring to the drawings in detail, an automatic switch controlling mechanism of this invention comprises a mounting base 10 which is adapted to be attached to a liquid tank, such as liquid tank 12, by means of a plurality of bolts 14. A sealing ring 16 may be used between the mounting base 10 and the tank 12 to seal against leakage of fluids therebetween.

A plate 18 is attached to the mounting base 10 by means of screws 19. To the plate 18 is attached a housing 20, having a neck portion 21. The neck portion 21 has a plate 23 integrally joined thereto. Screws 22 are used as attachment means between the plate 23 and the plate 18.

To the housing 20 is integrally attached a non-magnetic extending end wall 24 which is preferably cup shaped as shown in Figure 2. The cup shaped end wall 24 is provided with a peripheral flange 26 which is secured within the housing 20. To the flange 26 is attached a mounting block 28. Attached to the mounting block 28 and in engagement with the flange 26 is an annular bearing support member 30 which retains an annular bearing 32 concentric therewith.

Rotatably mounted within the bearing 32 is a shaft 34. Intermediate the ends of the shaft 34 is an integral flange 36. Attached to the flange 36 is an annular permanent magnet member or rotor 40. The shaft 34 extends through the magnet member 40 and is concentric therewith.

The portion of the shaft 34 within the bearing 32 is provided with a cavity 42. Within the cavity 42 is disposed a block 44 which is held within the cavity 42 by means of a pin 46.

An annular thrust bearing 48 is disposed at one end of the bearing 32 and an annular thrust bearing 50 is disposed at the other end of the bearing 32. The flange 36 is adapted to slidably engage the thrust bearing 50.

A plate 52 is attached to the block 28 by means of screws 54. To the plate 52 are attached a plurality of switch members 56 and 58 by means of screws 60, shown in Figure 3. Attached to the plate 52 intermediate the switches 56 and 58 is a bracket 62, shown in Figure 3, to which is pivotally attached, by means of a pin 64, an arm 66. The arm 66 is provided with an elongate slot 68 through which extends a finger 70 which is rigidly attached to the end of the shaft 34. The finger 70 extends eccentrically from the end of the shaft 34.

Therefore, it is understod that as the shaft 34 rotates, pivotal movement of the arm 66 results as the finger 70 moves within the slot 68 of the arm 66.

The arm 66 has opposed angular surfaces 72. One surface 72 engages an actuating stem 74 of the switch 56. The other surface 72 engages an actuating stem 76 of the switch 58. The arm 66 and the actuating stems 74 and 76 may be so disposed in spaced relation that pivotal movement of the arm 66 operates switches 56 and 58 simultaneously or the relationship may be such that pivotal movement of the arm 66 with rotation of the shaft 34 actuates one of the switches slightly before operation of the other switch.

As shown in Figure 2, a cover member 77 snugly fits into a portion of the neck 21 and the housing 20 and covers the switches 56 and 58.

Attached at the outer surface of the cup shaped end wall 24 is an annular bearing 78. A snap ring 79 retains the bearing 78 in proper position upon the end wall 24. Rotatably mounted upon the bearing 78 is an outer magnet rotor 80. The outer magnet rotor 80 is rotatably disposed intermediate guide bearings or thrust bearings 82 and 84. The bearing 78, the guide bearings 82 and 84, are made of non-magnetic material. Thus, it is understood that rotation of the outer magnet rotor 80 causes rotation of the inner magnet rotor 40.

A split clamping ring 88 is firmly retained at the periphery of the outer magnet rotor 80 by means of a clamping bolts 90. Integral with the clamping ring 88 is a lug 92 as shown in Figure 1. The lug 92 has an end portion 94 normal thereto. Pivotally attached to the end portion 94 of the lug 92 is a rod 96. The rod 96 is provided with a bifurcated end 98 at the end portion 94 and a pin 100 is inserted through the bifurcated end 98 and the end portion 94.

The rod 96 may be tubular and provided with an auxiliary rod 102 telescopically disposed therewithin. The auxiliary rod 102 is adjustable within the rod 96 and secured to the rod 96 by means of a nut 104.

At the end of the auxiliary rod 102 is firmly attached a base 106. Attached to the base 106 is a float 108 made of any suitable material.

As shown in Figure 1, a float guide 110 which may be in the form of a hollow cylinder provided with an end wall 112, is attached to the plate 18. The float guide member 110 is provided with a plurality of apertures 114 for passage of fluids to and from the interior of the guide member 110. Thus, as the liquid level within the tank 12 changes, the float 108 changes in elevation. With movement of the float 108, the rod 96 with the auxiliary rod 102 moves up or down, causing rotation of the outer magnet rotor 80, due to the fact that the outer magnet rotor 80 is attached to the rod 96 by means of the clamping ring 88. As the outer magnet rotor 80 rotates, the inner magnet rotor 40 is caused to rotate accordingly, due to the fact that the two magnet rotors are magnetically coupled.

As shown in Figure 5, the support base 10 may be attached to the bottom wall of the tank 12. For connection of the tubular rod 96 to the clamping ring 88, an L-shaped connection bracket 120 is used which is attached to the clamping ring 88 by means of the clamping bolt 90. A pin 121 pivotally connects the rod 96 to the bracket 120. The rod 96 is thus pivotally movable with respect to the clamping ring 88 with the float 108 uppermost.

It is to be understood that the assembly as shown in Figure 1 may be inverted and attached to the bottom of a tank so that the float 108 is uppermost.

In Figure 6 the assembly of this invention is shown attached to a side wall of the tank 12. When the assembly is so mounted, the L-shaped connection bracket 120 attached to the clamping ring 88 provides means for pivotal movement of the rod 96 with respect to the clamping ring 88 in the manner described with respect to Figure 5.

As shown in Figures 5 and 6 any suitable float guide means such as cylinders 122 and 124, respectively, may be used to guide the movement of the float 108. Each of these cylinders is provided with apertures 126 for flow of fluids to and from the interior thereof.

The switches 56 and 58 have connected thereto a plurality of wires or conductors 130 which terminate in a receptacle 132. Thus a plug such as plug 134 shown in Figures 1, 5 and 6 having the proper connection terminals, may be inserted into the receptacle 132 for connection to the switches 56 and 58 through the wires 130. The plug 134 is attached to the receptacle 132 by means of a knurled nut 138. Thus, it is understood that by means of the conductors 130, the receptacle 132, and the plug 134 of the assembly of this invention, electrical connections may be made to various instruments or control means to indicate or control the liquid level within the tank 12.

The assembly of this invention may be built of small physical size. The support base 10, which may carry the entire assembly, is readily and easily attached and detached from a liquid tank.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a liquid level indicating switch device, a housing adapted to be attached to a liquid tank, an electric switch supported by the housing, magnetic coupling means rotatably carried by the housing, a switch actuating device attached to said magnetic coupling means for rotation thereby and supported in operative relation to said switch, a float within said tank, means within the tank slidably retaining the float in straight line movement with rise and fall of the level of the liquid in the tank, and a rod having one end thereof attached to said magnetic coupling means, the other end of the rod being attached to the float.

2. In a liquid level indicating device comprising a support structure, a float, a magnetic coupling rotatably carried by said support structure, a lever attached to said float, the lever also being pivotally attached to said magnetic coupling, electric switch means carried by said support structure adjacent said magnetic coupling, and switch actuating means attached to said magnetic coupling.

3. In a liquid level indicating switch device, support structure, a magnetic coupler rotatably carried by the support structure, the magnetic coupler having an inner rotor and an outer rotor, a clamp attached to the outer rotor, an arm having one end thereof pivotally attached to the clamp, a float attached to the other end of the arm, elongate guide means slidably engaging the float and retaining the float in straight line movement and switch means operatively attached to the inner rotor of the magnetic coupler.

4. In a liquid level indicating device, support structure of the type having a magnetic coupler rotatably carried by the support structure, the magnetic coupler having an inner rotor and an outer rotor, the combination comprising a clamp attached to the outer rotor, a rod, one end of the rod being pivotally attached to the clamp, a float attached to the other end of the rod, and switch means operatively attached to the inner rotor of the magnetic coupler.

5. In a switch assembly adapted to indicate liquid level within a liquid tank, support structure attachable to the liquid tank, a magnetic coupler rotatably carried by the support structure, the magnetic coupler being provided with an inner rotor and an outer rotor, switch means carried by the support structure and operable by the inner rotor, a clamp attached to the outer rotor, tubular guide means attached to the support structure and extending therefrom, a float slidably movable within the tubular guide means, the guide means retaining the float in straight line movement, a rod, the rod having one end thereof attached to the float, the other end of the rod being pivotally attached to the clamp.

6. In an apparatus for indicating liquid level and adapted to be mounted on a liquid tank and of the type having support structure, magnetic coupler means rotatably carried by the support structure, the magnetic coupler means being provided with an inner rotor and an outer rotor, the combination comprising a float within said tank, means within the tank adjacent the float for guiding straight line movement thereof by rise and fall of the liquid in the tank, switch means carried by the support structure and operable by one of said rotors, and means connected to said float and to the other of said rotors for rotating the other of said rotors and thereby actuating the switch means through operation of the magnetic coupler.

7. In a liquid level indicating device comprising support structure, a float, magnetic coupler means rotatably carried by said support structure, a lever attached to said float, the lever being pivotally attached to said magnetic coupler means, switch means carried by said support structure, switch actuating means carried by said magnetic coupler means, and guide means for guiding the movement of the float.

8. In a liquid level indicating device, support structure, a magnetic coupler rotatably carried by the support structure, a rod, one end of the rod being pivotally attached to the magnetic coupler, and a float, the float being attached to the rod adjacent the other end thereof.

9. In a device for indicating liquid level, support structure, a pair of switch members carried in spaced apart relation by the support structure, a shaft rotatably mounted upon the support structure adjacent the switch members, a permanent magnet attached to the shaft, an arm pivotally carried by the support structure intermediate the switch members and operably engageable with the switch members, the arm having an elongate longitudinal slot therein, a pin eccentrically attached to the shaft and extending into the slot of the arm, a second permanent magnet mounted on the support structure for rotation about the axis of rotation of the first permanent magnet and in the plane of the first permanent magnet, a circumferential wall of non-magnetic material interposed between and out of contact with said permanent magnets, a movable float, means adjacent the float for guiding straight line movement thereof, and a rod attached to the float and to the second permanent magnet for rotation of the second permanent magnet with movement of the float.

References Cited in the file of this patent

UNITED STATES PATENTS

| | | |
|---|---|---|
| 2,248,030 | Zwack | July 1, 1941 |
| 2,257,348 | Rickmeyer | Sept. 30, 1941 |
| 2,620,412 | Ford | Dec. 2, 1952 |
| 2,717,934 | Collins | Sept. 13, 1955 |